(12) United States Patent
Sasaki et al.

(10) Patent No.: US 7,952,650 B2
(45) Date of Patent: May 31, 2011

(54) REFLECTOR AND PROJECTION TYPE DISPLAY APPARATUS

(75) Inventors: Hiroshi Sasaki, Mito (JP); Kiyomi Nakamura, Hitachi (JP); Hideto Momose, Hitachiota (JP); Sadayuki Nishimura, Yokohama (JP); Koji Hirata, Yokohama (JP); Kei Adachi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1505 days.

(21) Appl. No.: 11/356,097

(22) Filed: Feb. 17, 2006

(65) Prior Publication Data

US 2007/0034977 A1 Feb. 15, 2007

(30) Foreign Application Priority Data

Aug. 9, 2005 (JP) ................................. 2005-230237

(51) Int. Cl.
*H04N 9/31* (2006.01)
(52) U.S. Cl. ......... 348/744; 348/756; 359/584; 359/507
(58) Field of Classification Search .................. 348/744, 348/756, 751, 761, 766; 359/584, 515, 514, 359/507, 883, 884
See application file for complete search history.

(56) References Cited

U.S. PATENT DOCUMENTS

| | | | |
|---|---|---|---|
| 4,027,073 A | 5/1977 | Clark et al. | |
| 4,315,970 A | 2/1982 | McGee et al. | |
| 6,645,564 B2 * | 11/2003 | Hasegawa et al. | 427/402 |
| 6,752,500 B1 | 6/2004 | Yoshii et al. | |
| 7,182,475 B2 * | 2/2007 | Kramer et al. | 359/507 |
| 7,554,635 B2 * | 6/2009 | Nakagawa | 349/117 |
| 2002/0136844 A1 | 9/2002 | Hasegawa | |
| 2004/0027704 A1 | 2/2004 | Richard | |
| 2004/0120060 A1 | 6/2004 | Aihara et al. | |
| 2004/0233530 A1 | 11/2004 | Kramer | |

FOREIGN PATENT DOCUMENTS

| | | |
|---|---|---|
| CN | 1377476 | 10/2002 |
| CN | 1427959 | 7/2003 |
| JP | 10-305510 | 11/1998 |
| JP | 2002-122717 | 4/2002 |
| JP | 2002-256455 | 9/2002 |
| JP | 2003-297122 | 10/2003 |
| JP | 2004-123996 | 4/2004 |
| WO | WO 2005/026792 | 3/2005 |

OTHER PUBLICATIONS

Office Action issued in Chinese Patent Application No. 200610006824.5 on Aug. 15, 2008.
Office Action issued in Japanese Patent Application No. 2005-230237 on Jun. 15, 2010.

* cited by examiner

*Primary Examiner* — Jefferey Harold
*Assistant Examiner* — Jean W Désir
(74) *Attorney, Agent, or Firm* — Antonelli, Terry, Stout & Kraus, LLP.

(57) ABSTRACT

It is an object to prevent deterioration of reflectance of a reflection layer composed of silver or a silver alloy, resulting from heat-caused migration of silver. The reflector for projection type display apparatuses which display image light beams emitted and reflected by a light source, modulated for light intensity by a display device and magnified by a projection lens, wherein the reflector is provided, on the reflection surface side, with a reflection layer composed at least of silver or a silver alloy, and a layer comprising inorganic particles and a binder composed of a silicon compound; and a light source and image display device which use the reflector.

22 Claims, 4 Drawing Sheets

REFLECTOR AND PROJECTION TYPE DISPLAY APPARATUS

FIELD OF THE INVENTION

The present invention relates to a mirror having a high optical reflectance, in particular a mirror having a highly heat- and water-resistant reflection layer. A reflector provided in a light source for projection type display apparatuses is one of its major applications.

BACKGROUND OF THE INVENTION

Rear projection type liquid crystal TV sets and liquid crystal projectors are spreading both for commercial and domestic purposes. They are projection type display apparatuses which have a light source, e.g., ultra-high pressure mercury lamp, emitting light of high intensity to display projected images on a screen via a display device, e.g., liquid crystal display device.

For such a projection type display apparatus to keep image brightness for extended periods, it is essential that it has a light source serviceable for extended periods and, at the same time, a mirror as a reflector stably keeping reflection for effectively deflecting emitted light forward. A reflector should reflect light emitted from a light source in an adequate direction. Therefore, it is required to have high molding precision of a reflector and reliability of resistance to environment of its reflection film, among others. A lamp mounted on, or placed near, a reflector reaches a high temperature when it works continuously, and is cooled by a cooling fan or the like. Nevertheless, the reflector is required to be heat-resistant, because of a fairly large quantity of heat generated by the lamp. A silver or silver alloy layer, which has high reflectivity, can be formed by spraying an electroless plating solution without needing a vacuum process. Thus, coating a reflector with silver or a silver alloy layer brings a merit of dispensing with a vacuum process.

Patent Document described below discloses coating with a top coat layer as one of the techniques for preventing corrosion of a reflection layer of silver or the like.

Patent Document 1: JP-A-2002-256455

BRIEF SUMMARY OF THE INVENTION

This Patent Document 1, however, does not consider reflection film aging by a phenomenon known as migration occurring when a reflector is used at a high temperature.

The inventors of the present invention have found that a reflection layer of silver or silver alloy for a reflector in a projector or projection type TV set deteriorates in flatness and reflectance due to migration of silver, because the reflector is exposed to a high temperature. It is considered that deterioration of reflectance due to migration of silver cannot be sufficiently prevented for a reflector, even when its reflection layer is coated with a protective layer, as disclosed by Patent Document 1. It is an object of the present invention to provide a highly functional reflector which can prevent migration-caused aging, even when it works at a high temperature.

They have found, after having extensively studied various materials and methods, that a layer comprising a binder composed of a silicon compound having a hydrolyzable group and inorganic particles can prevent migration of silver, when provided on a reflection layer of silver or silver alloy, achieving the present invention.

They also have found that a water repellent layer provided on the above layer imparts resistance to salt water or the like to the reflection layer.

The means for solving the above problems are described below.

One of the means takes a structure comprising a reflector base, a reflection layer and a protection layer, in this order, wherein the reflection layer is composed of silver or a silver alloy, and the protection layer is a thin silicon-containing layer dispersed with inorganic particles. Moreover, the reflector base is composed of an organic resin or composite of organic resin and inorganic material. The inorganic particles are silicon oxide, aluminum oxide or titanium oxide particles. Each of the reflection layer or protection layer is 100 to 200 nm thick, inclusive.

Another means takes a structure with a water repellent layer of a fluororesin on the protection layer, or with an under layer of titanium oxide or silicon oxide between the reflector base and reflection layer.

A still another means takes a projector structure with a light source, the reflector which reflects light emitted from the light source, display device and projection lens. The display device has a liquid crystal layer placed between a pair of base boards. The reflector has a structure with the protection layer, reflection layer and reflector base, in this order from the light source.

A still another means takes a projection type TV set structure with a light source, the reflector which reflects light emitted from the light source, display device, projection lens, mirror which reflects light from the projection lens, and screen on which light reflected by the mirror is displayed. The display device has a liquid crystal layer placed between a pair of base boards. The reflector has a structure with the protection layer, reflection layer and reflector base, in this order from the light source.

The present invention of the above structure provides a reflector which can prevent heat-caused deterioration of reflectance characteristics. It also provides a projector and projection type TV set continuously serviceable for extended periods by use of the reflector.

Other objects, features and advantages of the invention will become apparent from the following description of the embodiments of the invention taken in conjunction with the accompanying drawings.

DESCRIPTION OF THE REFERENCE NUMERALS

1: Reflector base, 2, 43: Reflection layer, 3: Protection layer, 4: Water repellent layer, 5: Under layer, 6, 16: Reflector, 7: Adhesive layer, 8: Light emitting tube, 9: Electrode for discharge, 10: Electrode, 11: Lead, 12: Lead stopper, 13: First reflector, 14: Second reflector, 15: Lamp, 16: Reflector, 17: Concave lens, 18: First lens array, 19: Second lens array, 20: Polarization converter, 21: Display device (red), 22: Display device (green), 23: Display device (blue), 24: Condenser lens, 25: Condenser lens (red), 26: Condenser lens (green), 27: Condenser lens (blue), 28: First relay lens, 29: Second relay lens, 30 to 33: Mirror, 34, 35: Dichroic mirror, 36: Dichroic-cross-prism, 37: Projection lens, 38: Screen, 39: Housing, 40: Optical unit, 41: Mirror, 42: Screen, 44: Protection layer, 45: Light emitting diode, 46: Insulation layer, 47: Lead frame, 48: Heat sink plate, 49: Light source unit, 50: Optical firms, 51: Non-radiation display panel

DETAILED DESCRIPTION OF THE INVENTION

First, the present invention is outlined. It is to be understood that the present invention is not limited to the embodiments described below, and various variations can be made without departing from the spirit and scope of the present invention.

[1] Layered Structure of Reflector

Figure 1:
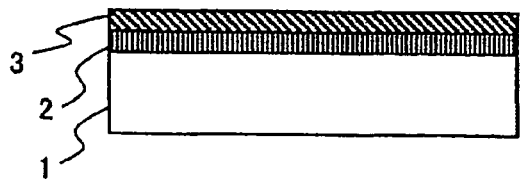
FIG. 1 is a cross-sectional view schematically illustrating a reflector of the present invention.
Figure 2:
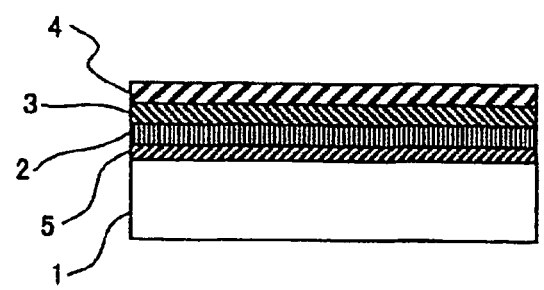
FIG. 2 is a cross-sectional view schematically illustrating another reflector of the present invention.

FIG. 1 presents a cross-sectional view schematically illustrating a reflector of the present invention. The reflector shown in FIG. 1 comprises the reflector base 1 which has the reflection layer 2 and thin silicon-containing layer 3 dispersed with inorganic particles to prevent migration of silver, in this order. FIG. 2 schematically illustrates an improved version of the reflector shown in FIG. 1. It is further provided with the layer (water repellent layer) 4 of transparent resin on the layer 3 to enhance water repellency. It is also provided with the under layer 5 between the reflector base 1 and reflection layer 2 to prevent evaporation of a volatile material in the reflector from the reflection layer side. These additional layers work for different functions, and exhibit their functions when used either individually or in combination.

Next, each layer is described in detail.

(1) Reflector Base

In the reflector shown in FIG. 1, the reflector base is heated by the heat from the light source to a temperature varying depending on a specific apparatus and light emitting tube adopted therein. It is about 140 to 160° C. when the light emitting tube has an output of 200 W. Therefore, a material for the base is required to be heat-resistant to a temperature of about 160° C. in this case. Glass or a ceramic material is suitable for the base viewed from its heat resistance. It is however difficult to mold glass or ceramic material at a high precision. In this respect, a heat-resistant organic resin or its composite with an inorganic material is suitable, because high molding precision can be secured. The suitable organic resins for the present invention include polyether ketone, polyphenylene sulfide, aromatic polyamide, liquid crystal polymer and polybutyl terephthalate, which are molten or softened at about 300° C. but sufficiently heat-resistant to a temperature of about 160° C. not to cause deformation-related problems when used for a reflector, because they are processable by molding under an elevated pressure. Moreover, polycarbonate and polyethylene terephthalate are also suitable, although softened at a lower temperature than the above resins, because they can be heat-resistant to a temperature of about 160° C. or more when reinforced with glass fibers at 10 to 50% or so, and processable by molding under an elevated pressure. They can have improved heat resistance when reinforced with fine particles of metals and ceramic materials, e.g., those of silicon oxide, titanium oxide, aluminum oxide and zinc oxide, in addition to glass fibers. Still more, thermosetting resins may be also used. These resins include epoxy resin polymer (for which a compound having a plurality of amino groups or hydroxyl groups, or phenol resin is used as a curing agent), polyimide, melamine resin and urea resin. They are formed into a shape by treating their monomers or precursors at elevated temperature and pressure in a mold.

The base is formed by various methods, first of all by compression molding in which the material is molded under an elevated pressure in a mold. The other methods include transfer molding, injection molding and extrusion.

(2) Reflection Layer

The reflection layer for the reflector of the present invention is composed of silver or a silver alloy. The layer is formed by electroless plating method for the present invention. The coating solution is composed of a metallic salt solution and reducing reagent solution, which are spread and mixed with each other on the collector surface. When silver is used, for example, the coating solution is composed of an ammonia-containing silver nitrate solution and reducing reagent solution. It is more preferable to use a coating method in which a spreading member is not in contact with the surface to be coated, e.g., spin, flow or spray coating, than a method in which it is in contact with the surface, e.g., roll, bar or brush coating. When spin coating is employed, for example, it is preferable to spread a silver nitrate solution and reducing reagent solution individually from different nozzles onto the collector surface dropwise, and mix them with each other thereon. So is in the case of spray coating.

The reducing reagents useful for the present invention include hydrazine sulfate, sodium hydroxide, glyoxal, triethanolamine, sodium thiosulfate, ascorbic acid and hypophosphorous acid.

The reflection layer is preferably at least 50 nm thick, because incident light is almost reflected with transmission of light considerably prevented. Transmitted light increases and reflected light decreases as the thickness decreases from 50 nm. The thickness is preferably 100 nm or more to reduce transmitted light to almost zero. It should be noted that the layer will lose physical strength when it is excessively thick. Therefore, the thickness is preferably 300 nm or less, ideally 200 nm or less. In consideration of the above, the thickness is preferably 50 to 300 nm, more preferably 100 to 200 nm.

Spreading a tin chloride solution beforehand is a preferable procedure to promote adhesion of silver.

(3) Protection Layer (Ag-migration Resistant Layer)

This layer comprises a binder composed of a silicon compound having a hydrolyzable group and inorganic particles. It is considered that this layer prevents migration of silver or a silver alloy because the fine irregularities formed by the particles in the interface with the reflection layer work to prevent the migration.

More specifically, the silicon compound for the binder contains an alkoxy silane or halogenated silyl group. These compounds are described later in detail. The inorganic particles are those of silicon oxide, aluminum oxide and titanium oxide, among others, of which silicon oxide prevents the migration more efficiently. The Ag-migration resistant layer is preferably formed by spreading and then curing a coating solution of the silicon compound and inorganic particles dissolved or dispersed in an adequate liquid (hereinafter referred to as solvent), because the spreading/curing needs no vacuum process and can save the production cost. Each material for the coating solution is described below.

(a) Binder Material

An alkoxy silane or halogenated silyl group loses alcohol or halogen atom in the presence of water or the like, changing into a structure with hydroxyl group bound to silicon. Then, this structure reacts with the unreacted alkoxy silane or halogenated silyl group to eliminate alcohol or halogenated hydrogen and, at the same time, to form the silicon-oxygen-silicon bond. An alkoxy silane or halogenated silyl group changes into silicon oxide as the above reaction proceeds, to form a binder. In other words, the binder formed from a compound having an alkoxy silane or halogenated silyl group is of silicon oxide.

Silicon oxide is substantially transparent, because it has no absorption in the visible region. Moreover, it has a low refractive index of about 1.5, which brings another advantage that it has only a limited effect on reflection-related properties of the reflection layer of silver on which it is formed, because of limited reflection in the interface with silver.

The fine silicon oxide particles preferably have a size below 100 nm to secure layer transparency. The larger particles will scatter visible light, reducing light transmittance of the Ag-migration resistant layer and making the layer whity. Visible light has a wavelength range of about 400 to 700 nm. The particles having a size of 100 nm, i.e., one-fourth of the lower limit (400 nm) of the wavelength range, or more tend to scatter visible light. Therefore, they preferably have a size below 100 nm.

The silicon compounds for the binder are described by taking those having an alkoxysilane group. Those having a halogenated silyl group can be treated in a similar manner. One of the materials for the binder is silica sol. It is prepared by the following common procedure. A tetraalkoxysilane, when heated in a weakly acidic condition, has its alkoxy group hydrolyzed into hydroxyl group, which reacts with nearby alkoxysilane group to increase the molecular weight while forming the silicon-oxygen-silicon bond. The product generally has an average molecular weight reaching several thousands. The product having an excessively low molecular weight (e.g., several hundreds) will cause problems resulting from partial evaporation, when heated in the subsequent step to form a film of silicon oxide. On the other hand, the product having an excessively high molecular weight (e.g., several tens of thousands) will cause problems resulting from separating out from the coating solution, because it is insoluble in the solvent.

Tetraalkoxysilanes useful for production of silica sol include tetramethoxysilane, tetraethoxysilane, tetrapropoxysilane, tetraisopropoxysilane, tetraisobutoxysilane and tetramethoxysilane. Other useful compounds include silicon compounds having chlorine group in place of alkoxysilane group, e.g., silicon tetrachloride.

Silicon compounds, other than silica sol, having a hydrolyzable residue include those having amino, chloro, mercapto group or the like, in addition to tetraalkoxysilanes. More specifically, they include 3-aminopropyltriethoxysilane, 3-aminopropyltrimethoxysilane, N-(2-aminoethyl)-3-aminopropyltrimethoxysilane, 3-chloropropyltrimethoxysilane, 3-chloropropylmethyldimethoxysilane, 3-mercaptopropyltrimethoxysilane, vinyl trimethoxysilane, vinyl triethoxysilane, 3-glycidoxypropyltrimethoxysilane, 3-glycidoxypropylmethyldimethoxysilane and 3-methacryloxypropyltrimethoxysilane. Silane coupling agents having amino, glycidyl or vinyl group are particularly preferable, because they are highly binding to the fine particles, described later, to improve film strength. Those having amino group are more preferable, because they work to control oxidation of silver.

(b) Inorganic Particles

The suitable inorganic particles include those of silicon oxide, aluminum oxide and titanium oxide, of which silicon oxide is more suitable because it has a higher light transmittance and control deterioration of reflectance of the reflection layer more efficiently.

When the inorganic particles are spherical, they preferably have an average particle diameter of 190 nm or less to prevent scattering of incident visible light (wavelength: 380 to 760 nm). The particles having an average diameter of 190 nm or more may scatter incident light sufficiently to make the film turbid and reduce intensity of light reflected by the reflection layer. When they are chained, they also preferably have an average particle diameter of 190 nm or less for the same reasons. Transparency of the film increases as the inorganic particles become finer. Therefore, the particle diameter is more preferably 100 nm or less. The lower limit of the fine particles of silicon oxide is 9 nm or so in consideration of availability. However, no problem is anticipated when the particles are finer, so long as they are well dispersed in the film.

A silicon compound having a hydrolyzable residue, which works as a matrix, will cause problems when it is insufficiently soluble in a solvent, because the particles agglomerate each other into secondary particles also to make the film turbid. It is therefore recommended to use a solvent which can well disperse the particles, when possible. However, such a solvent may not be always used depending on type of the reflector base. In such a case, a solvent can be incorporated with a dispersant. More specifically, a nonionic dispersant is suitable. Some ionic dispersants may accelerate polymerization of silicon compound having a hydrolyzable residue, to make the coating solution significantly viscous before it is spread, or even impossible to be spread because it is cured into gelled or completely solid state according to circumstances. It is therefore desired to confirm whether such a phenomenon occurs or not before an ionic dispersant is actually used. Moreover, use of a dispersant tends to deteriorate film strength. It is therefore desired not to use a dispersant as far as possible, or dose it in a minimum quantity if it is used.

Of inorganic particles, colloidal silica particles as silicon oxide particles are suitable. Commercial colloidal silica particle products include organosilica sol (Snowtex, Nissan Chemical Industries). These fine particles are highly hydrophilic, because of hydroxyl group massively present on the surface. A layer containing these particles is hydrophilic and, at the same time, very low in electrical resistance, specifically of the order of $1 \times 10^{10}$ to $10 \times 10^{10} \Omega$, roughly 1/10,000 to 1/1,000,000 of that of glass, acrylic resin, polycarbonate resin, PET resin or the like. Therefore, it prevents deposition of dust or the like on the surface. Hydrophilic group massively present on the surface brings other advantages, a compound having an alkoxysilane group being bound more massively to the surface than to glass surface or the like, and improved adhesion of a water repellent layer to be formed on the Ag-migration resistant layer.

Aluminum oxide particles as inorganic particles are preferably in the form of alumina sol, because of improved dispersibility in the coating solution.

Titania oxide particles as inorganic particles can be prepared by stirring an alcohol solution of titania sol, after it is incorporated with an acid. Fine titanium oxide particles having a diameter of 100 nm or less are prepared by neutralizing the solution when its turbidity increases to some extent.

(c) Solvent

An effective solvent for the coating solution dissolves or uniformly disperses the binder. An alcohol-based solvent is suitable, when the coating solution is composed of silica sol as the binder and fine silicon oxide particles. More specifically, suitable alcohols include ethanol, n-propanol, isopropanol, n-butanol, isobutanol, tert-butanol, n-pentanol, isopentanol and tert-pentanol. These compounds tend to have a higher boiling point as they have a larger carbon number, and a lower boiling point as they are more branched.

(4) Water Repellent Layer

Protection layer (the Ag-migration resistant layer) is composed of silicon oxide. Polymerization of alkoxysilane group for forming a layer is accompanied by dealcoholization to decrease film density. Therefore, the layer is not water-repellent. As a result, moisture may gradually penetrate into the layer, when it is placed under a high humidity atmosphere. And the layer cannot protect the reflection layer of silver from corrosion. Therefore, the Ag-migration resistant layer is preferably coated with a water repellent layer, to improve durability of the reflection layer of silver even when it works under a high humidity atmosphere.

The water repellent layer is preferably composed of a transparent material which little absorbs reflected light in the visible region. At the same time, it is required to be water-repellent, and further required to be heat-resistant at 160° C. or higher. In consideration of these, the layer is preferably made of a fluororesin. Commercial fluororesin products include Cytop (ASAHI GLASS COMPANY) and INT304VC (INT Screen, now NI Material Co., Ltd.). After being diluted with a solvent, the resin is coated on the Ag-migration resistant layer. Next the coated layer is heated to evaporate the solvent and, depending on circumstances, thermally cured to form the water repellent layer. A transparent resin heat-resistant at 160° C. or higher, e.g., polyethylene naphthalate, may be used in place of the above.

The water repellent layer is preferably thicker to exhibit water repellency more efficiently, more specifically 50 nm thick or more, more preferably 100 nm or more. The thickness, however, is preferably 200 nm or less, because the layer will go down physical strength when it is excessively thick. The thickness, therefore, is preferably in a range from 100 to 200 nm, in consideration of water repellency and physical strength.

(5) Under Layer

The reflector base, which is made of an organic resin, may lose the low-molecular-weight or monomer component(s) by evaporation, when used for extended periods at an elevated temperature. Therefore, the base is preferably coated with an under coat as a barrier layer to prevent the evaporated component(s) from moving towards the Ag-migration resistant layer and others.

The under layer is preferably composed of titanium oxide, silicon oxide or the like. It can be formed by curing titania sol, silica sol or the like. Description of silica sol is omitted, because it is already mentioned before for the Ag-migration resistant layer. Titania sol can be prepared by polymerizing tetramethoxy titanium, tetraethoxy titanium, tetrapropoxy titanium, tetrabutoxy titanium or the like to a molecular weight of several thousands.

The under layer is preferably thicker to prevent evaporation of the low-molecular-weight or polymer component(s), more specifically 1 μm or more. However, adhesion between the reflector base and reflection layer tends to deteriorate when it is excessively thick. More specifically, deteriorated adhesion starts to appear notably as the thickness exceeds 10 μm. The thickness, therefore, is preferably in a range from 1 to 10 μm, in consideration of preventing evaporation of the low-molecular-weight or polymer component(s) and adhesion.

[2] Reflector

Figure 3:
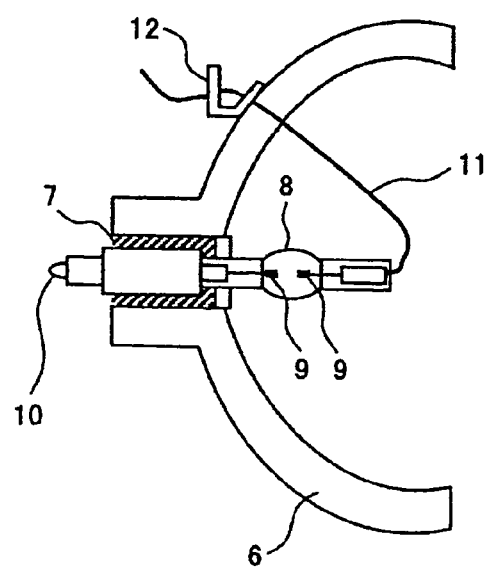
FIG. 3 schematically illustrates a light source unit structure in which the reflector of the present invention is used.

FIG. 3 schematically illustrates a light source unit structure in which the reflector of the present invention is used. It is the reflector 6 of layered structure, illustrated in FIG. 1 or 2, on which the light emitting tube 8 is fixed by the adhesive layer 7. The light emitting tube 8 uses an ultra-high pressure mercury lamp in this embodiment, and hence is provided with the electrode 9 for discharge inside. It is supplied with electricity via the electrode 10 and lead 11. The lead 11 is positioned in such a way not to come into contact with the light emitting tube 8, which can reach a high temperature, except for the portion connected to the tube 8, and is supported by the lead stopper 12 to prevent sagging. The adhesive agent for the adhesive layer 7 should be resistant to heat from the tube 8. Therefore, a heat-resistant ceramic material is suitable for the agent. The tube 8 preferably emits light in the visible region strongly. Ultraviolet ray of shorter wavelength may cause generation of ozone, which, when generated for extended periods, may damage the reflector base. Therefore, a high-pressure mercury lamp, ultra-high pressure mercury lamp or the like is suitable for the tube 8. Suitable lamp housing materials include quartz and glass, of which glass is more suitable for its capacity of cutting off ultraviolet ray of shorter wavelength.

Figure 4:
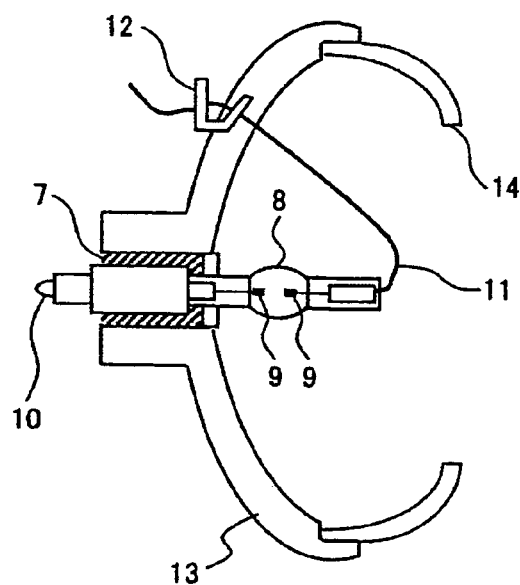
FIG. 4 schematically illustrates another light source unit structure in which the reflector of the present invention is used.

FIG. 4 schematically illustrates another light source unit structure in which 2 reflectors are used. Hereinafter, the one on the light emitting tube side is referred to as the first reflector 13 and the one on the other side to the second reflector 14. This structure is adopted when the lamp has a high output to generate much heat. In this case, the first reflector is made of a heat-resistant material, e.g., glass, because a resin reflector base portion on which a light emitting tube, which reaches the highest temperature in the structure, is mounted may not withstand the heat. The second reflector 14, which is not directly in contact with the tube, can be made of a resin. A reflector base reaches about 140 to 160° C. at the highest, when an ultra-high pressure mercury lamp as a light emitting tube has a power consumption of about 100 to 200 W. At a consumption of 300 W, on the other hand, the temperature increases to about 240° C., at which a resin reflector base is found to show a heat-caused deformation. In the structure shown in FIG. 4, with the reflector base divided into 2 reflectors, first reflector 13 of glass and second reflector 14 of a resin, temperature which the second reflector 14 reaches is limited to about 120° C. Therefore, the type illustrated in FIG. 4 is suitable, when a resin reflector cannot withstand heat generated by a light emitting tube of high output.

[3] Applicable Areas

One of the applicable areas which the reflector of the present invention can find is a light source unit for rear projection type TV sets. It can find use in a light source unit for front projection type TV sets, when its optical system is altered. Other applicable areas include a back light reflector for liquid crystal displays and illuminator for vehicles, e.g., automobiles. A reflection layer of silver or a silver alloy can have improved heat resistance, when provided with an Ag-migration resistant layer, to stably output light intensity for extended periods.

The Ag-migration resistant layer formed on the reflection layer of the reflector of the present invention is expected to prevent not only the heat-caused migration but also electricity-caused one. For example, the migration in a silver interconnection can be prevented by placing an Ag-migration resistant layer between the interconnections. More specifically, an Ag-migration resistant layer is formed on a plane on which the interconnections are formed and on the interconnections themselves. It is also expected to prevent the migration in a metallic layer formed on a non-metallic material, e.g., glass or resin. In this case, Ag-migration resistant layers are provided in such a way to hold the metallic layer in-between to prevent the migration.

The present invention is described in more detail by Examples. It is to be understood that scope of the present invention is not limited to the embodiments described in these examples.

EXAMPLE 1

A reflector base was coated with a metallic salt solution and reducing reagent solution by a spraying method to form a reflection layer. The metallic salt solution was an ammoniacal solution of silver nitrate and the reducing reagent solution was of triethanolamine. The layer thickness was controlled at 100 nm on the average by controlling solution concentration and spraying time.

Next, a mixed solution of 1 part of a silica sol solution containing solids at about 2% by mass and 5 parts of colloidal silica (particle diameter: 10 to 15 nm and solid content: 30% by mass) was prepared. One of the two reflector bases, each coated with the reflection layer as described above, was coated with the above mixed solution on the reflection layer by a spraying method, and heated at 160° C. for 10 minutes. This produced a layer comprising a binder composed of a silicon compound having a hydrolyzable group and inorganic particles, i.e., Ag-migration resistant layer. The layer thickness was controlled at 50, 90, 100, 200 or 240 nm on the average by controlling solution concentration and spraying time. The reflector coated only with the reflection layer but no Ag-migration resistant layer was also prepared.

An ultra-high pressure mercury lamp of 200 W was mounted on each of these reflectors and lighted. Light intensity was measured after it was stabilized, and also 12 and 120 hours thereafter. The results are given in Table 1.

TABLE 1

| Evaluation items | Lighted time (h) | Thickness of Ag-migration resistant layer (nm) | | | | | |
|---|---|---|---|---|---|---|---|
| | | 0 | 50 | 90 | 100 | 200 | 240 |
| Light intensity, relative to the initial level (%) | 12 | 80 | 100 | 100 | 100 | 100 | 100 |
| | 120 | 70 | 97 | 98 | 100 | 100 | 100 |
| Peel strength (N/m) | | >1000 | >1000 | >1000 | >1000 | >1000 | 700 |

The reflector with no Ag-migration resistant layer showed light intensity decreasing by as much as 20% in 12 hours after it was stabilized. By contrast, the one provided with the Ag-migration resistant layer showed no intensity decrease. The reflector with no Ag-migration resistant layer showed light intensity decreasing by as much as 30% in 120 hours. By contrast, the one provided with the Ag-migration resistant layer showed no intensity decrease, when the layer was 100 nm thick or more, although the one having the Ag-migration resistant layer of below 100 nm in thickness lost intensity to some extent. The reflector with no Ag-migration resistant layer had the reflection layer losing visually observed gloss in 120 hours. By contrast, the one provided with the Ag-migration resistant layer had the reflection layer which kept its initial gloss. It was also observed that each of the reflection layer and Ag-migration resistant layer reached about 140 to 180° C. immediately after a lapse of 12 and 120 hours, reaching a higher temperature as it neared the lamp.

Next, the Ag-migration resistant layer was evaluated for adhesiveness by a peel strength test. The results are also given in Table 1. Peel strength was 100 N/m or more with those having a thickness of 200 nm or less, but tended to decrease as the thickness increased beyond the above level. It is found, therefore, that thickness of the Ag-migration resistant layer is preferably 100 nm or more viewed from controlled decrease in reflectance and 200 nm or less viewed from adhesiveness.

As discussed above, it is confirmed that a layer comprising a binder composed of a silicon compound having a hydrolyzable group and inorganic particles, i.e., Ag-migration resistant layer, can control deterioration of reflectance of the reflector on which it is formed. It is also found that a suitable range of thickness of the Ag-migration resistant layer is 100 to 200 nm.

EXAMPLE 2

A coating solution was prepared in the same manner as in Example 1, except that alumina sol (particle diameter: 10 to 20 nm and solid content: 10% by mass) was used in place of colloidal silica at the same content. Then, it was spread and heated on a reflection layer to form an Ag-migration resistant layer, containing aluminum oxide particles as inorganic particles and having a thickness of about 100 nm, to prepare a reflector.

Next, tetrapropyl orthotitanate was incorporated with diluted hydrochloric acid and heated to prepare titanium oxide particles having an average particle diameter of 10 nm. A coating solution was prepared in the same manner as in Example 1, except that a suspension of the above particles (solid content: 20% by mass) was used in place of colloidal silica at the same content. Then, it was spread and heated on a reflection layer to form an about 100 nm thick Ag-migration resistant layer, to prepare a reflector.

An ultra-high pressure mercury lamp of 200 W was mounted on each of these reflectors and lighted. Light intensity was measured after it was stabilized, and also 12 and 120 hours thereafter. The results are given in Table 2.

TABLE 2

| Evaluation items | Lighted time (h) | Inorganic particles in the Ag-migration resistant layer | |
|---|---|---|---|
| | | Aluminum oxide | Titanium oxide |
| Light intensity, relative to the initial level (%) | 12 | 100 | 100 |
| | 120 | 100 | 100 |

Each of the reflectors provided with the Ag-migration resistant layer showed no intensity decrease. The reflection layer coated with the Ag-migration resistant layer kept its initial gloss in 120 hours, as confirmed by visual observation.

EXAMPLE 3

A reflector whose reflection layer was coated with an about 100 nm thick Ag-migration resistant layer was prepared in a manner similar to that for Example 1.

Next, a solution of Cytop CTL-107M (ASAHI GLASS COMPANY) diluted with the provided solvent for dilution to 1%. It was spread and heated on the Ag-migration resistant layer to prepare a reflector whose Ag-migration resistant layer was coated with a water repellent layer. A reflector whose Ag-migration resistant layer was coated with no water repellent layer was also prepared.

An ultra-high pressure mercury lamp of 200 W was mounted on each of these reflectors and lighted. Light intensity was measured after it was stabilized. Then, each of these reflectors was put in a high-humidity, constant-temperature container kept at 80° C. and 80% RH for 100 hours, and the lamp was again lighted to measure light intensity after it was stabilized. The results are given in Table 3.

TABLE 3

| Evaluation items | Environment in which the reflector was put | With or without water repellent layer | |
|---|---|---|---|
| | | Without | With |
| Light intensity, relative to the initial level (%) | High temperature, high humidity (80° C. and 80% RH) | 80 | 98 |
| | Gas atmosphere (NO$_2$: 3 ppm and H$_2$S: 1.5 ppm) | 70 | 98 |

The reflector provided with no water repellent layer showed light intensity decreasing by as much as 20%. By contrast, the one provided with the Ag-migration resistant layer showed no intensity decrease.

EXAMPLE 4

A reflector whose Ag-migration resistant layer was coated with a water-repellent layer was prepared in a manner similar to that for Example 3. Another reflector provided with no water repellent layer was also prepared. An ultra-high pressure mercury lamp of 200 W was mounted on each of these reflectors and lighted, to measure light intensity after it was stabilized.

Then, each reflector was put in a container kept at 30° C. and 70% RH and containing hydrogen sulfide (H$_2$S) and nitrogen dioxide (NO$_2$) at 1.5 and 3.0 ppm, respectively for 24 hours, after the ultra-high pressure mercury lamp was taken off. The lamp was mounted again on each reflector and lighted, to measure light intensity after it was stabilized. The results are also given in Table 3.

The reflector provided with no water repellent layer showed light intensity decreasing by as much as 40%. By contrast, the one provided with the water repellent layer showed an intensity decrease to only a limited extent. The reflection layer of the former reflector turned black. Silver sulfide was detected by the analysis, suggesting that silver was sulfided by hydrogen sulfide.

It is confirmed, as discussed in Examples 3 and 4, that a water repellent layer provided on an Ag-migration resistant layer improves moisture- and gas-resistance of the reflector.

EXAMPLE 5

A reflector provided with an Ag-migration resistant layer (thickness: about 100 nm) was prepared in the same manner as in Example 1, except that an under layer (thickness: about 1 μm) was formed in the reflector before it was provided with a reflection layer by spreading and heating a silica sol solution (solid content: about 2% by mass). Another reflector provided with no under layer was also prepared. An ultra-high pressure mercury lamp of 200 W was mounted on each of these reflectors and lighted, to measure light intensity after it was stabilized.

Then, each reflector was put in a constant-temperature container kept at 200° C. for 24 hours, after the ultra-high pressure mercury lamp was taken off. The lamp was mounted again on each reflector and lighted, to measure light intensity after it was stabilized. This test was carried out in anticipation of use of the reflector under a more severe, high-temperature condition. The results are also given in Table 4.

TABLE 4

| Evaluation items | Environment in which the reflector was put | With or without under layer | |
|---|---|---|---|
| | | Without | With |
| Light intensity, relative to the initial level (%) | High temperature (200° C.) | 80 | 98 |

The reflector provided with no under layer showed light intensity decreasing by as much as 20%. By contrast, the one provided with the under layer showed an intensity decrease to only a very limited extent. The reflection layer in the former reflector had fine irregularities on the surface, whereas the one in the latter reflector had no irregularities. It is considered that these irregularities are formed as a result of evaporation of some substance from the reflector inside. It is also considered that the under layer blocks an evaporated substance moving from and towards the reflection layer side, to prevent formation of the irregularities on the reflection layer surface and deterioration of light intensity.

EXAMPLE 6

Figure 5:
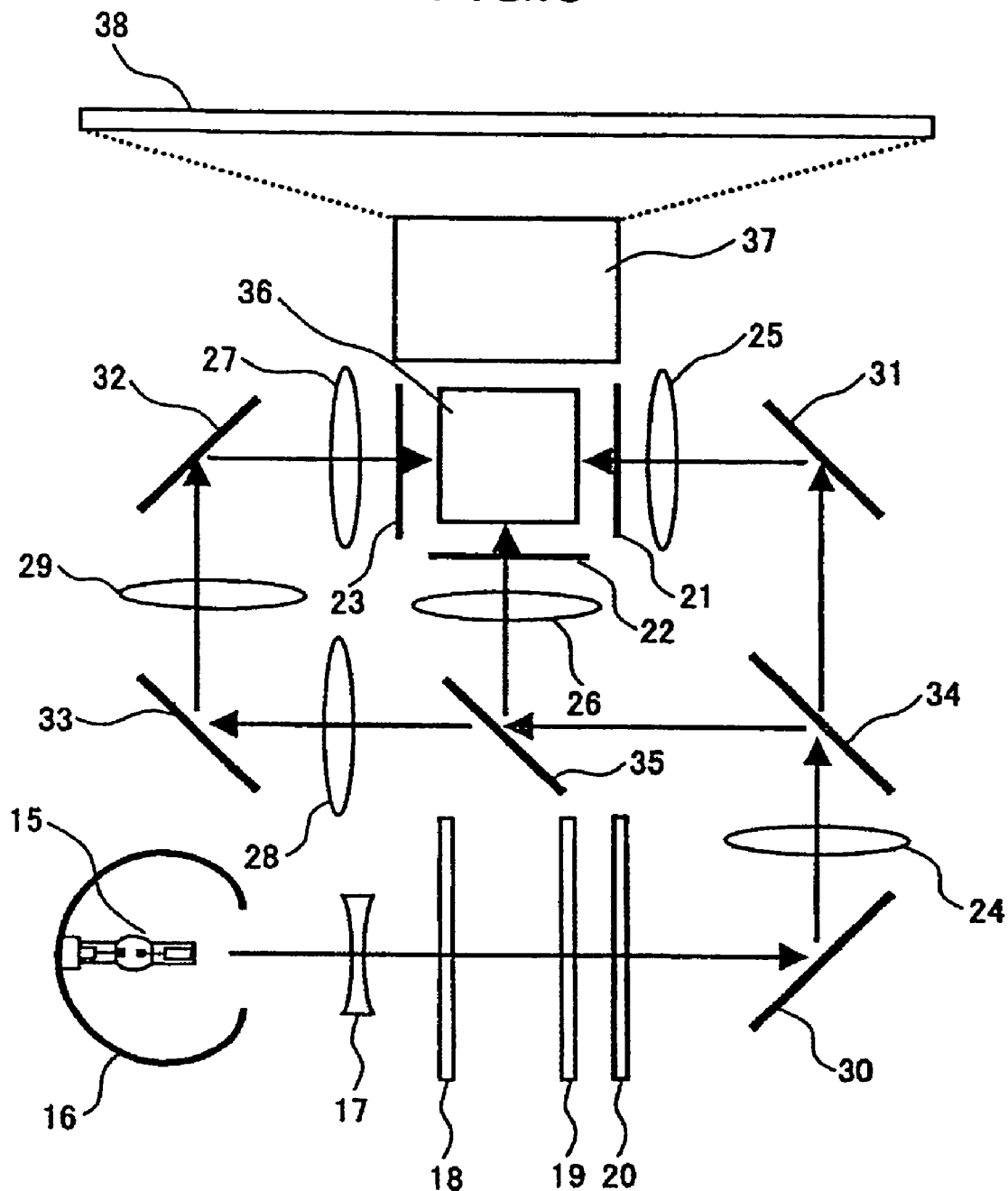
FIG. 5 schematically illustrates an optical system for a projector of the present invention.

Example 6 prepared a liquid crystal projector in which the reflector prepared in Example 1 (provided with a 100 nm thick Ag-migration resistant layer) was used, and also prepared a liquid crystal projector with a reflector having no Ag-migration resistant layer for comparison. FIG. 5 schematically illustrates the optical system for the liquid crystal projector of the present invention.

First, the optical system for the projector is described.

White light emitted from the lamp 15 is condensed by the reflector 16, and directed towards the first lens array 18 via the concave lens 17. The first lens array 18 divides the incident light beams into a plurality of beams to pass them efficiently through the second lens array 19 and polarization converter 20, to which it directs the beams. The second lens array 19 projects the images at the lens cells of the first lens array 18 onto the display device (red) 21, display device (green) 22 and display device (blue) 23 corresponding to the images of the 3 primitive colors (red, green and blue), respectively by its lens cells corresponding to these colors. The projected images from the lens cells of the first lens array 18 are superimposed on the images at the display devices 21, 22 and 23 by the condenser lens 24, condenser lens (red) 25, condenser lens (green) 26, condenser lens (blue) 27, first relay lens 28 and second relay lens 29. Moreover, the mirrors 30 to 33 are provided to deflect light in the optical system. In the above process, the dichroic mirrors 34 and 35 separate white light emitted from the light source into the 3 primitive colors of red, green and blue, which are directed towards the respective display devices 21, 22 and 23. The images on the display devices 21, 22 and 23 are color-synthesized by the dichroic-cross-prism 36, and then projected onto the screen 38 by the projection lens 37, to form the large-size images on the screen. The first relay lens 28 and second relay lens 29 are provided to compensate for a longer light path from the light source to the display device 23 than those from the light source to the display devices 21 and 22. The condenser lenses 25, 26 and 27 are provided to prevent spread of the beams which have passed through the display devices 21, 22 and 23, in order to secure efficient projection by the projection lens 37.

Image brightness on the liquid-crystal projector screen was first measured after it was stabilized, and then measured again after the projector was continuously operated for 12 hours.

The liquid-crystal projector provided with no Ag-migration resistant layer showed brightness decreasing by as much as 20% in 12 hours. By contrast, the one provided with the Ag-migration resistant layer showed no brightness decrease.

It is thus confirmed that a liquid-crystal projector can prevent deterioration of image brightness, when provided with a reflector coated with a layer comprising a binder composed of a silicon compound having a hydrolyzable group and inorganic particles, i.e., Ag-migration resistant layer.

EXAMPLE 7

Figure 6:
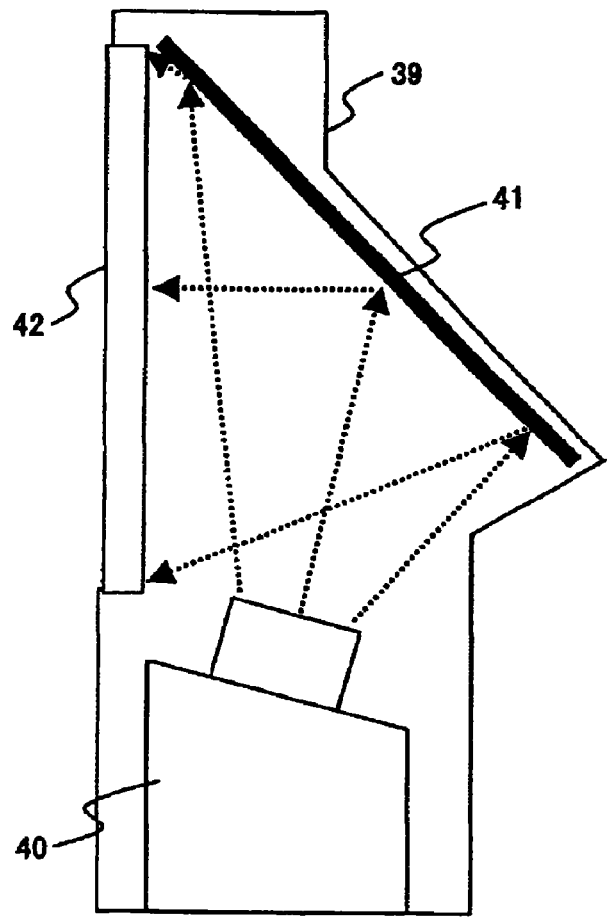
FIG. 6 schematically illustrates a projection type TV set as one of the display apparatuses of the present invention.

Example 7 prepared a rear projection type TV set in which the reflector prepared in Example 1 (provided with a 100 nm thick Ag-migration resistant layer) was used, and also prepared a liquid crystal projector with a reflector having no Ag-migration resistant layer for comparison. FIG. 6 schematically illustrates the projection type TV set the present invention.

The optical unit 40, mirror 41 and screen 42 were provided in the housing 39. The optical unit 40 was the same as the one illustrated in FIG. 5 except that the screen 38 was excluded. Image light emitted from the optical unit was deflected by the mirror 41 towards the screen 42 to be displayed thereon.

Image brightness on the rear projection type TV set screen was first measured after it was stabilized, and then measured again after the TV set was continuously operated for 12 hours.

The TV set provided with no Ag-migration resistant layer showed brightness decreasing by as much as 20% in 12 hours. By contrast, the one provided with the Ag-migration resistant layer showed no brightness decrease.

It is thus confirmed that a rear projection type TV set can prevent deterioration of image brightness, when provided with a reflector coated with a layer comprising a binder composed of a silicon compound having a hydrolyzable group and inorganic particles, i.e., Ag-migration resistant layer.

EXAMPLE 8

Figure 7:
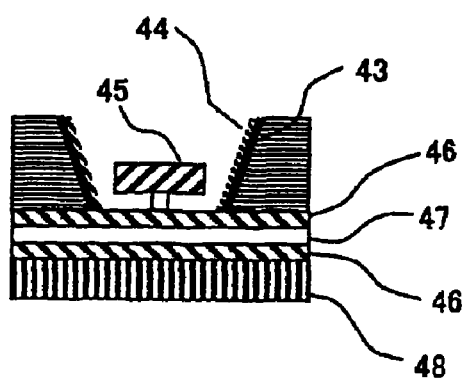
FIG. 7 schematically illustrates a light source unit for a display apparatus of the present invention.

The reflection layer 43 and Ag-migration resistant layer 44 were formed using the solution prepared in Example 1 for the light source unit illustrated in FIG. 7.

The light source unit had the light emitting diode chip 45 which was supplied with power from the lead frame 47 placed between the insulation layers 46. The heat sink plate 48 was provided on the underside of the insulation layer, to release heat generated in the light source unit. Nevertheless, however, temperature increased to around 100° C. when the unit was continuously operated for 12 hours.

The light source unit provided only with the reflection layer but no Ag-migration resistant layer was also prepared.

Figure 8:
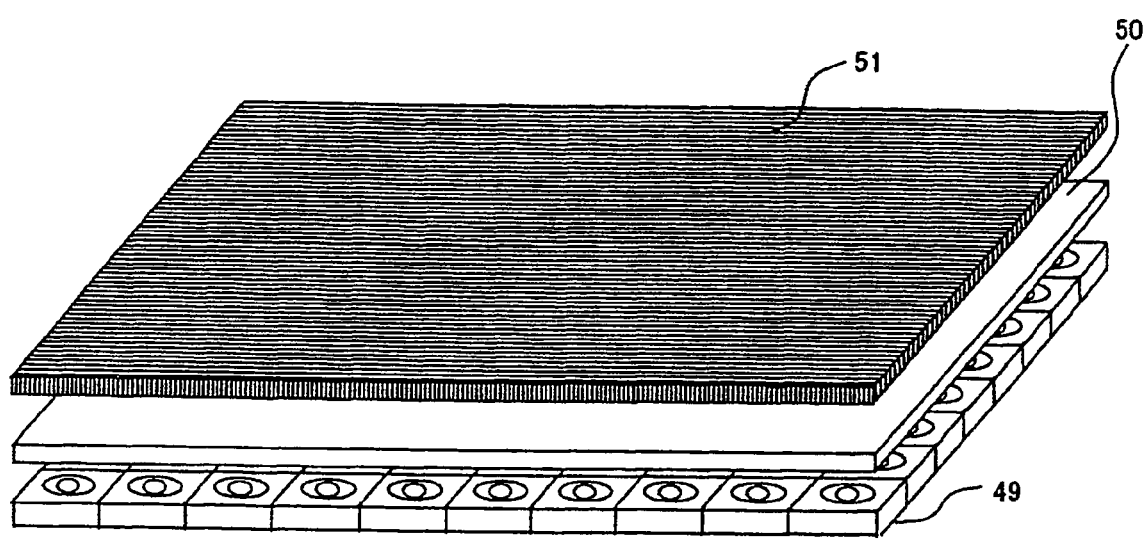
FIG. 8 schematically illustrates a display apparatus of the present invention.

FIG. 8 schematically illustrates the display apparatus provided with the light source units.

A plurality of the light source units 49 were arranged to form the light source for the display apparatus. The light source supported the optical firms 51 (comprising a diffusion plate, prism sheet and the like, not shown) and non-radiation display panel (liquid crystal display panel in this embodiment), in this order. The non-radiation display panel was composed of a rear polarization plate, liquid crystal layer, color filter layer, front polarization plate and the like, not shown).

Image brightness on the display apparatus was first measured after it was stabilized, and then measured again after the apparatus was continuously operated for 12 hours.

The display apparatus provided with no Ag-migration resistant layer showed brightness decreasing by as much as 10% in 12 hours. By contrast, the one provided with the Ag-migration resistant layer showed no brightness decrease.

It is thus confirmed that a display apparatus can prevent deterioration of image brightness for extended periods of operation, when provided with a light source having a reflector coated with a layer comprising a binder composed of a silicon compound having a hydrolyzable group and inorganic particles, i.e., Ag-migration resistant layer.

EXAMPLE 9

A reflection layer and Ag-migration resistant layer were formed using the solution prepared in Example 1 on a reflector base for an automobile headlamp. The headlamp provided only with the reflection layer but no Ag-migration resistant layer was also prepared.

Each headlamp was provided with a tungsten lamp and lighted to measure light intensity first after it was stabilized, and then again after the lamp was continuously operated for 12 hours.

The headlamp provided with no Ag-migration resistant layer showed light intensity decreasing by as much as 10% in 12 hours. By contrast, the one provided with the Ag-migration resistant layer showed no light intensity decrease.

It is thus confirmed that an automobile headlamp can prevent deterioration of light intensity for extended periods of operation, when provided with a reflector coated with a layer comprising a binder composed of a silicon compound having a hydrolyzable group and inorganic particles, i.e., Ag-migration resistant layer.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A reflector comprising:
   a reflector base;
   a reflection layer; and
   a protection layer,
   in this order, wherein the reflection layer is composed of silver or a silver alloy, and
   wherein the protection layer comprises a binder and inorganic particles, and the binder is composed of a silicon compound,
   wherein the protection layer has a thickness of from 100 to 200 nm.

2. The reflector according to claim 1, wherein the reflector base is composed of an organic resin, or a composite of an organic resin and an inorganic material.

3. The reflector according to claim 1, wherein the inorganic particles are selected from the group consisting of silicon oxide, aluminum oxide and titanium oxide particles.

4. The reflector according to claim 1, wherein the reflection layer is 100 to 200 nm thick, inclusive.

5. The reflector according to claim 1, wherein the binder is silica sol and the inorganic particles are silicon oxide.

6. The reflector according to claim 1, wherein a water repellent layer composed of a fluororesin is provided on the protection layer.

7. The reflector according to claim 6, wherein the water repellent layer is 100 to 200 nm thick, inclusive.

8. The reflector according to claim 1, wherein an under layer composed of titanium oxide or silicon oxide is provided between the reflector base and reflection layer.

9. The reflector according to claim 8, wherein the under layer is 1 to 10 μm thick, inclusive.

10. The reflector according to claim 1, wherein a water repellent layer composed of a fluororesin is provided on the protection layer and an under layer composed of titanium oxide or silicon oxide is provided between the reflector base and reflection layer.

11. The reflector according to claim 10, wherein the water repellent layer is 100 to 200 nm thick, inclusive, and the under layer is 1 to 10 μm thick, inclusive.

12. A projection type display apparatus comprising:
a light source;
a reflector which reflects a light emitted from the light source;
a display device; and
a projection lens,
wherein the reflector is the one according to claim 1.

13. A projection type display apparatus comprising:
a light source; a reflector which reflects light emitted from the light source;
a display device; and
a projection lens,
wherein the reflector is the one according to claim 10.

14. The projection type display apparatus according to claim 12, wherein a liquid crystal layer is provided between a pair of base boards of the display device.

15. The projection type display apparatus according to claim 12, wherein the reflector comprises the protection layer, the reflection layer and the reflector base, in this order from the light source.

16. A projection type TV set comprising:
a light source;
a reflector which reflects a light emitted from the light source;
a display device;
a projection lens;
a mirror which reflects a light from the projection lens; and
a screen on which a light reflected by the mirror is displayed,
wherein the reflector is the one according to claim 1.

17. A projection type TV set comprising: a light source; a reflector which reflects a light emitted from the light source; a display device; a projection lens; a mirror which reflects a light from the projection lens; and a screen on which a light reflected by the mirror is displayed, wherein the reflector is the one according to claim 10.

18. The projection type TV set according to claim 16, wherein a liquid crystal layer is provided between a pair of base boards of the display device.

19. The projection type TV set according to claim 16, wherein the reflector comprises the protection layer, the reflection layer and the reflector base, in this order from the light source.

20. The reflector according to claim 1,
wherein the inorganic particles are spherical and irregularities are formed in the interface between the reflection layer and the protection layer, and
wherein a content of the inorganic particles is from 8.33% by mass to 25% by mass.

21. The reflector according to claim 1, wherein the silicon compound contains a hydrolyzable group.

22. The reflector according to claim 21, wherein the hydrolyzable group is selected from the group consisting of an alkoxy silane and a halogenated silyl group.

* * * * *